(12) United States Patent
Harada et al.

(10) Patent No.: US 11,342,807 B2
(45) Date of Patent: May 24, 2022

(54) MOTOR AND PUMP DEVICE

(71) Applicant: NIDEC SANKYO CORPORATION, Nagano (JP)

(72) Inventors: Masaki Harada, Nagano (JP); Hiroki Kuratani, Nagano (JP); Takashi Yamamoto, Nagano (JP); Nobuki Kokubo, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 350 days.

(21) Appl. No.: 16/483,809

(22) PCT Filed: Feb. 7, 2018

(86) PCT No.: PCT/JP2018/004140
§ 371 (c)(1),
(2) Date: Aug. 6, 2019

(87) PCT Pub. No.: WO2018/150967
PCT Pub. Date: Aug. 23, 2018

(65) Prior Publication Data
US 2020/0195080 A1   Jun. 18, 2020

(30) Foreign Application Priority Data

Feb. 14, 2017   (JP) .............................. JP2017-024967

(51) Int. Cl.
*H02K 5/08* (2006.01)
*F04D 13/06* (2006.01)
(Continued)

(52) U.S. Cl.
CPC .............. *H02K 5/08* (2013.01); *F04D 13/06* (2013.01); *F04D 29/18* (2013.01); *F04D 29/40* (2013.01);
(Continued)

(58) Field of Classification Search
CPC .. H02K 5/08; H02K 5/16; H02K 7/14; H02K 15/14; H02K 21/16; F04D 13/06
(Continued)

(56) References Cited

FOREIGN PATENT DOCUMENTS

| JP | 2007023877 A | 2/2007 |
|---|---|---|
| JP | 2008109848 A | 5/2008 |

(Continued)

OTHER PUBLICATIONS

Oxford Languages; https://www.google.com/search?q=midpoint+dictionary&rlz=1C1GCEB_enUS792US792&oq=midpoint&aqs=chrome.0.69i59j0i433i512j69i57j0i433i512j0i512j0i433j0i131i433i512j0i457i512j0i512j46i175i199i512.2288j0j4&sourceid=chrome&ie=UTF-8 (Year: 2021).*

(Continued)

*Primary Examiner* — Terrance L Kenerly
(74) *Attorney, Agent, or Firm* — Cantor Colburn LLP

(57) ABSTRACT

A motor may include a rotor provided with a rotating shaft that protrudes to a first side in an axial direction; a stator disposed on an outer peripheral side of the rotor; a resin sealing member that covers the stator; and a cover member that is disposed on the first side of the resin sealing member and supports the rotating shaft. The cover member may include a plurality of gate marks disposed at different angular positions and a plurality of ribs that protrude to a second side in the axial direction. The ribs may be disposed at positions where each midpoint between the gate marks adjacent to each other in the circumferential direction overlap with an axis of the rotor.

10 Claims, 9 Drawing Sheets

(51) Int. Cl.
   *F04D 29/18* (2006.01)
   *F04D 29/40* (2006.01)
   *H02K 7/14* (2006.01)
   *H02K 21/16* (2006.01)
   *H02K 15/14* (2006.01)
   *H02K 5/16* (2006.01)

(52) U.S. Cl.
   CPC ............. *H02K 5/16* (2013.01); *H02K 7/14* (2013.01); *H02K 15/14* (2013.01); *H02K 21/16* (2013.01)

(58) Field of Classification Search
   USPC .......................................................... 310/86
   See application file for complete search history.

(56) References Cited

FOREIGN PATENT DOCUMENTS

| | | | |
|---|---|---|---|
| JP | 2012151981 A | 8/2012 |
| JP | 2013245658 A | 12/2013 |
| JP | 2014230361 A | 12/2014 |
| JP | 2016003580 A | 1/2016 |

OTHER PUBLICATIONS

International Search Report corresponding to Application No. PCT/JP2018/004140; dated Apr. 24, 2018.

* cited by examiner

MOTOR AND PUMP DEVICE

CROSS REFERENCE TO RELATED APPLICATIONS

This is the U.S. national stage of application No. PCT/JP2018/004140, filed on Feb. 7, 2018. Priority under 35 U.S.C. § 119(a) and 35 U.S.C. § 365(b) is claimed from Japanese Application No. 2017-024967, filed Feb. 14, 2017; the disclosures of which are incorporated herein by reference.

TECHNICAL FIELD

At least an embodiment of the present invention relates to a pump device and a motor used for the pump device.

BACKGROUND

Patent Literature 1 discloses a pump device that rotates an impeller by means of a motor. The motor used in the pump device of Patent Literature 1 includes a rotor and a stator disposed on the outer peripheral side of the rotor, wherein the stator is covered and sealed with a BMC resin. A case member (upper case) that forms a pump chamber is secured by screws to a resin sealing member covering the stator. The stator includes a stator core, an insulator, and a coil wire wound around the insulator. The coil wire is connected to a connector for external connection through a substrate. In the connector, a connection portion with the substrate is covered with the resin sealing member, but a terminal for external connection protrudes in the radial direction from an outer peripheral surface of the resin sealing member.

CITATION LIST

[Patent Literature 1] Japanese Unexamined Patent Application Publication No. 2016-3580

In the motor described in Patent Literature 1, the case member (upper case) constituting the pump chamber is secured by screws to the resin sealing member. However, securing by screws requires the use of a securing screw, and it is necessary to provide a screw securing portion in the upper case and in the resin sealing member. Therefore, the number of parts is large and the structure is complicated. If an adhesive agent is used for bonding purposes without using a screw, for example, bonding can be achieved as a result of interposing an adhesive agent on a part where the upper case and the resin sealing member make contact in the axis line direction of the motor.

Here, if the upper case is a resin molded article, a hollow shape is provided to ensure the molding properties are adequate. However, if a hollow shape is provided, the contact area with the resin sealing member decreases. Therefore, if an adhesive agent is used for bonding purposes, there is a concern that the bonding strength may decrease because the area to which the adhesive agent can be applied becomes smaller. Furthermore, there is a concern that the strength of the upper case may decrease as a result of providing a hollow shape.

SUMMARY

In view of the above problems, at least an embodiment of the present invention ensures, in a motor which includes a resin sealing member that covers a stator, the strength of a cover member secured to the resin sealing member.

In order to solve the above problems, a motor of at least an embodiment of the present invention includes: a rotor provided with a rotating shaft that protrudes on a first side in an axis line direction; a stator disposed on an outer peripheral side of the rotor; a resin sealing member that covers the stator; and a cover member disposed on the first side of the resin sealing member and supports the rotating shaft; wherein the cover member includes a plurality of gate marks disposed at different angular positions and a plurality of ribs that protrude on a second side in the axis line direction, and the ribs are disposed at positions where each midpoint between the gate marks adjacent to each other in the circumferential direction overlap with the axis line.

In the motor of at least an embodiment of the present invention, a resin molded article is used as the cover member secured to the resin sealing member, and ribs are formed on the cover member at positions that overlap with each midpoint of adjacent gate marks in the axis line direction. In this manner, locations (weld lines) at which resin flowing in from adjacent gates merge at the time of molding the cover member can be reinforced by the ribs. As a result, the strength of the cover member can be ensured.

In at least an embodiment of the present invention, it is desirable that the plurality of gate marks is annularly disposed around the rotating shaft, and the plurality of ribs extends in the radial direction around the rotating shaft. In this manner, the ribs can be disposed along the weld lines. Therefore, the strength of the cover member can be ensured.

In at least an embodiment of the present invention, it is desirable that the cover member includes a cover member side securing surface that faces, in the axis line direction, a resin sealing portion side securing surface provided on the resin sealing portion, the cover member side securing surface is secured to the resin sealing portion side securing surface via an adhesive agent layer, and the cover member side securing surface is positioned on the same plane as the tip surfaces of the plurality of ribs. In this manner, an adhesive agent can be applied to the tip surfaces of the reinforcing ribs for use as a securing surface. Therefore, the area of the securing surface can be ensured. Furthermore, if the ribs extend in the radial direction, the securing surface can be extended to the inner peripheral side to ensure the securing strength.

In at least an embodiment of the present invention, it is desirable that a first adhesive agent reservoir portion which recesses on the first side is provided between the ribs adjacent to each other. In this manner, the adhesive agent that protrudes from the cover member side securing surface can be retained in the first adhesive agent reservoir portion. Furthermore, if an adhesive agent is applied to the tip surfaces of the ribs and used as a securing surface, the adhesive agent that protrudes from the tip surfaces of the ribs can be retained in the first adhesive agent reservoir portion. Therefore, even if the application amount of the adhesive agent is not strictly controlled, adverse effects that arise due to protrusion of the adhesive agent caused by excessive application can be suppressed.

In at least an embodiment of the present invention, the first adhesive agent reservoir portion doubles as a hollow shape of the cover member. In this manner, the molding properties of the cover member can be improved.

In at least an embodiment of the present invention, it is desirable that the cover member side securing surface is provided with a chamfered surface formed on an edge which is adjacent to the first adhesive agent reservoir portion. If such a chamfered shape is provided, the surface tension of the adhesive agent can to be used to collect the adhesive agent at the edge of the cover member side securing surface, and therefore, the securing strength can be increased. Furthermore, if the ribs include a chamfered surface formed on an edge of the tip surface facing the second side, because the surface tension of the adhesive agent can be used to collect the adhesive agent along the edges of the ribs, the securing strength can be increased. Further, as a result of collecting the adhesive agent at the edges of the ribs, which extend in the radial direction, the detent effect of the cover member can be increased.

In at least an embodiment of the present invention, the cover member side securing surface and the resin sealing member side securing surface are provided on the entire circumference. In this manner, because the adhesive agent can be distributed to the entire circumference, the adhesive agent is capable of preventing the entry of water and the like toward the rotor side, providing a waterproof effect. Therefore, a waterproof member such as an O-ring can be omitted, and costs can be reduced.

In at least an embodiment of the present invention, a configuration can be employed wherein the cover member includes a protrusion portion that protrudes on the second side and covers an outer peripheral side of the resin sealing member, an engagement protrusion portion is provided on an outer peripheral surface of the resin sealing member, and the protrusion portion includes a rotation engagement portion that engages the engagement protrusion portion as a result of the cover member being rotated around the rotating shaft in a state where the cover member is in contact with the resin sealing member in the rotation axis line direction. In this manner, because the cover member is relatively rotated with respect to the resin sealing member at the time the rotation engagement portion is engaged, the adhesive agent can be spread in the circumferential direction. Furthermore, for example, if the adhesive agent is delivered to the entire circumference to provide a waterproof effect, and an O-ring is omitted, malfunctions such as the twisting of the O-ring caused by rotation of the cover member can be resolved.

In at least an embodiment of the present invention, it is desirable that the ribs and the gate marks are each disposed at equal angular intervals. In this manner, the cover member can be uniformly reinforced.

Next, a pump device of at least an embodiment of the present invention includes: the motor described above; and an impeller attached to an end portion of the rotating shaft which passes through the cover member and protrudes on the first side of the cover member.

According to at least an embodiment of the present invention, the cover member secured to the resin sealing portion is a resin molded article, and ribs are formed on the cover member at positions that overlap with each adjacent gate mark. Therefore, locations (weld lines) at which resin flowing in from adjacent gates merge at the time of molding the cover member can be strengthened by the ribs. As a result, the strength of the cover member can be ensured.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Hereinafter, an embodiment of a pump device and a motor to which at least an embodiment of the present invention has been applied is described with reference to the drawings.

Overall Configuration of Pump Device

Figure 1:
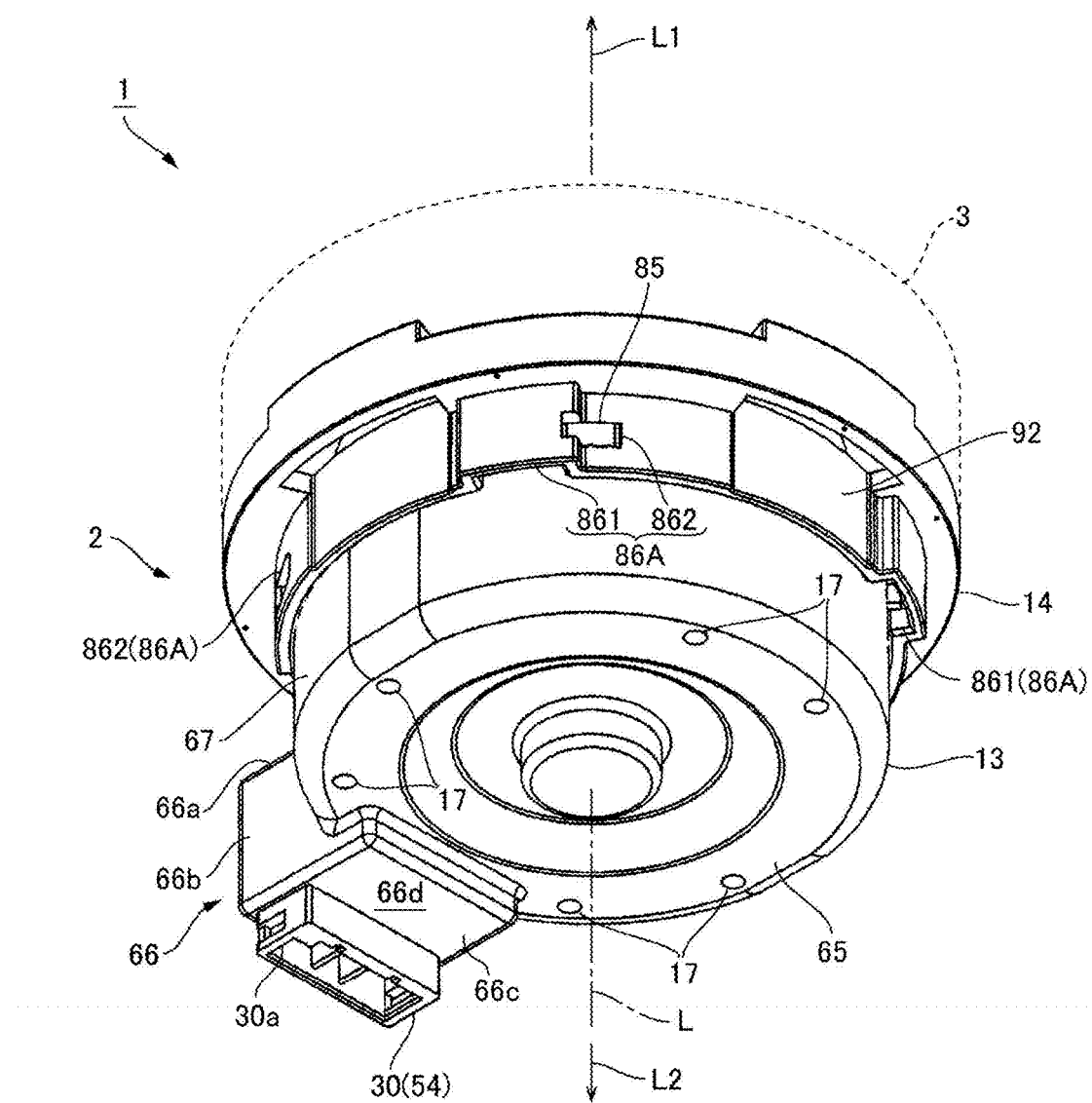
FIG. 1 is an external perspective view of a pump device to which at least an embodiment of the present invention has been applied.
Figure 2A:
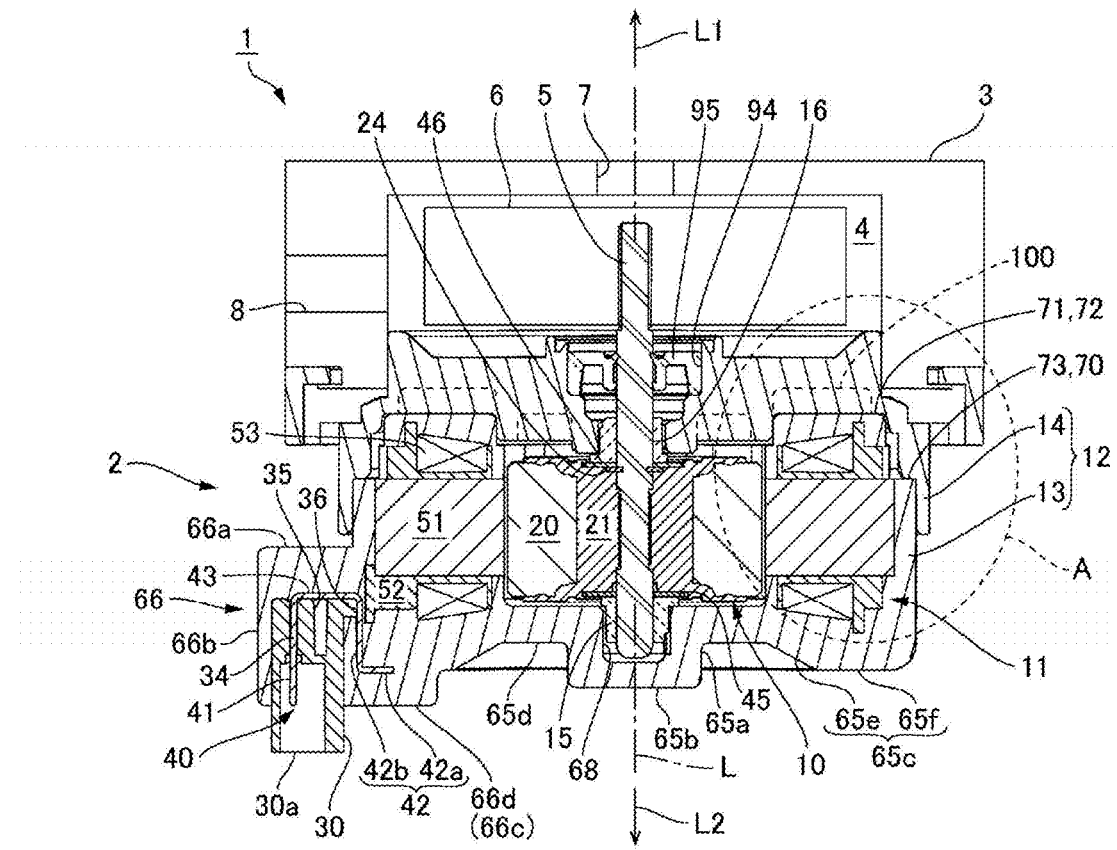
FIG. 2A and FIG. 2B are a cross-sectional view of the pump device and a partially enlarged view thereof.
Figure 2B:
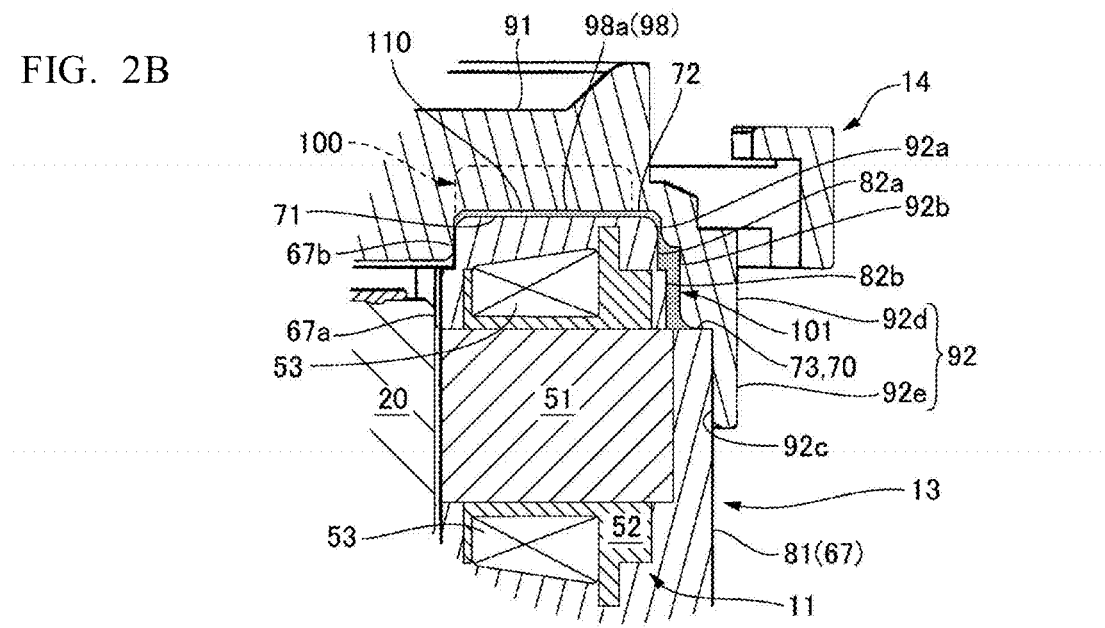

FIG. 1 is an external perspective view of a pump device 1 to which at least an embodiment of the present invention has been applied. Furthermore, FIG. 2A is a cross-sectional view of the pump device 1, and FIG. 2B is a partially enlarged view of region A in FIG. 2A. The pump device 1 includes: a motor 2; a case body 3 attached to the motor 2 that forms a pump chamber 4 between the motor 2 and the case body 3; and an impeller 6 which is attached to a rotating shaft 5 of the motor 2 and disposed inside the pump chamber 4. The case body 3 is provided with a fluid inlet port 7 and discharge port 8. When the motor 2 is driven to rotate the impeller 6, fluid such as water drawn from the inlet port 7 is discharged from the discharge port 8 via the pump chamber 4.

In the present specification, reference numeral L indicates the axis line direction of the motor 2, where the output side L1 represents a first side in the axis line L direction, and the counter output side L2 represents a second side in the axis line L direction. FIG. 1 is an external perspective view of the pump device 1 as viewed from the counter output side L2. The rotating shaft 5 of the motor 2 extends in the axis line L direction. Furthermore, the side on which the impeller 6 is disposed with respect to the motor 2 is referred to as the output side L1, and the opposite side to the output side L1 is referred to as the counter output side L2. Furthermore, the direction orthogonal to the axis line L is referred to as the radial direction, and the axis line L periphery is referred to as the circumferential direction. As shown in FIG. 2A and FIG. 2B, the inlet port 7 is provided in a position overlapping the axis line L of the rotating shaft 5 of the motor 2 inside the case body 3, and the discharge port 8 is provided outside the rotating shaft 5 in the radial direction.

Figure 3:
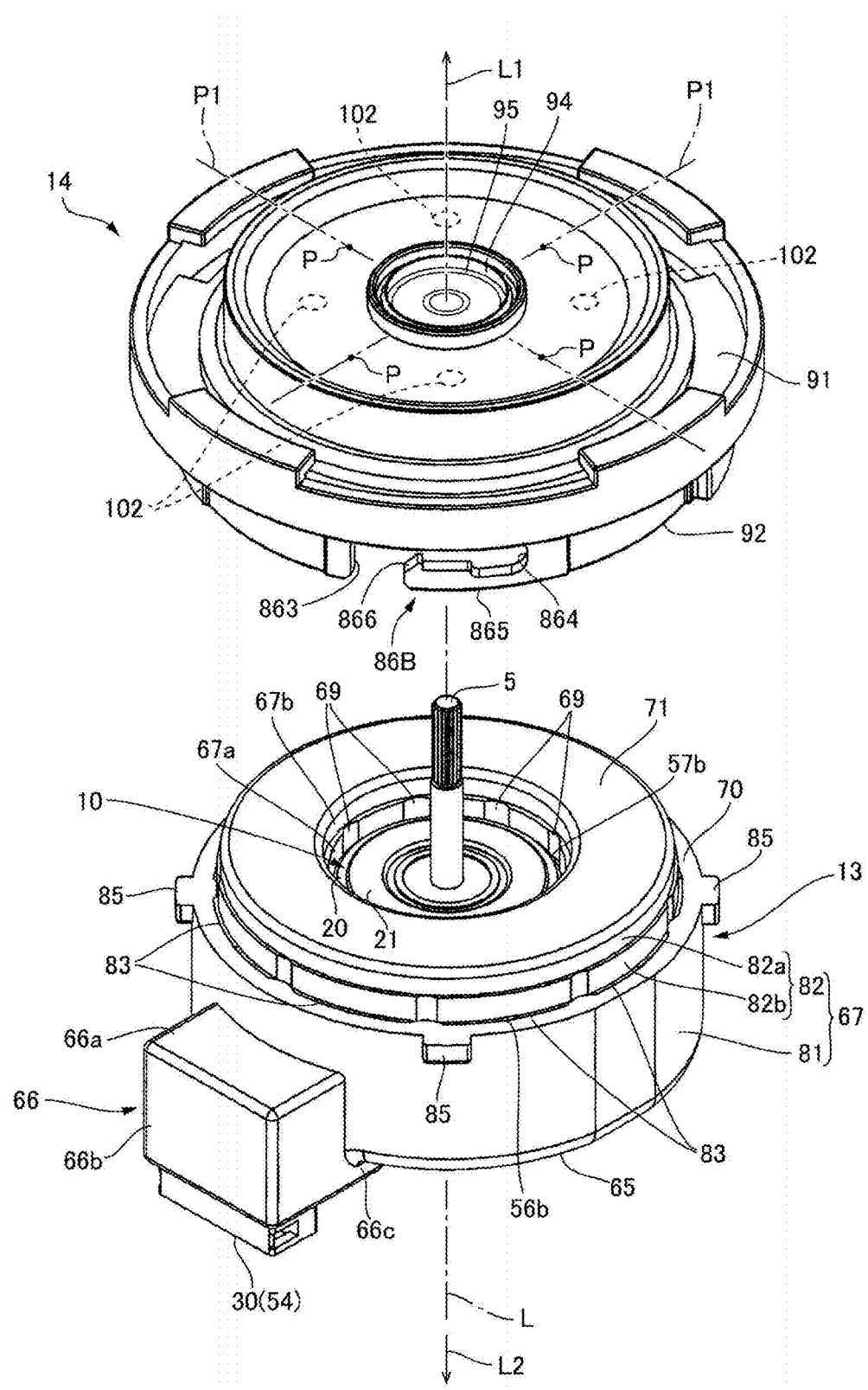
FIG. 3 is an exploded perspective view of a motor viewed from the output side.
Figure 4:
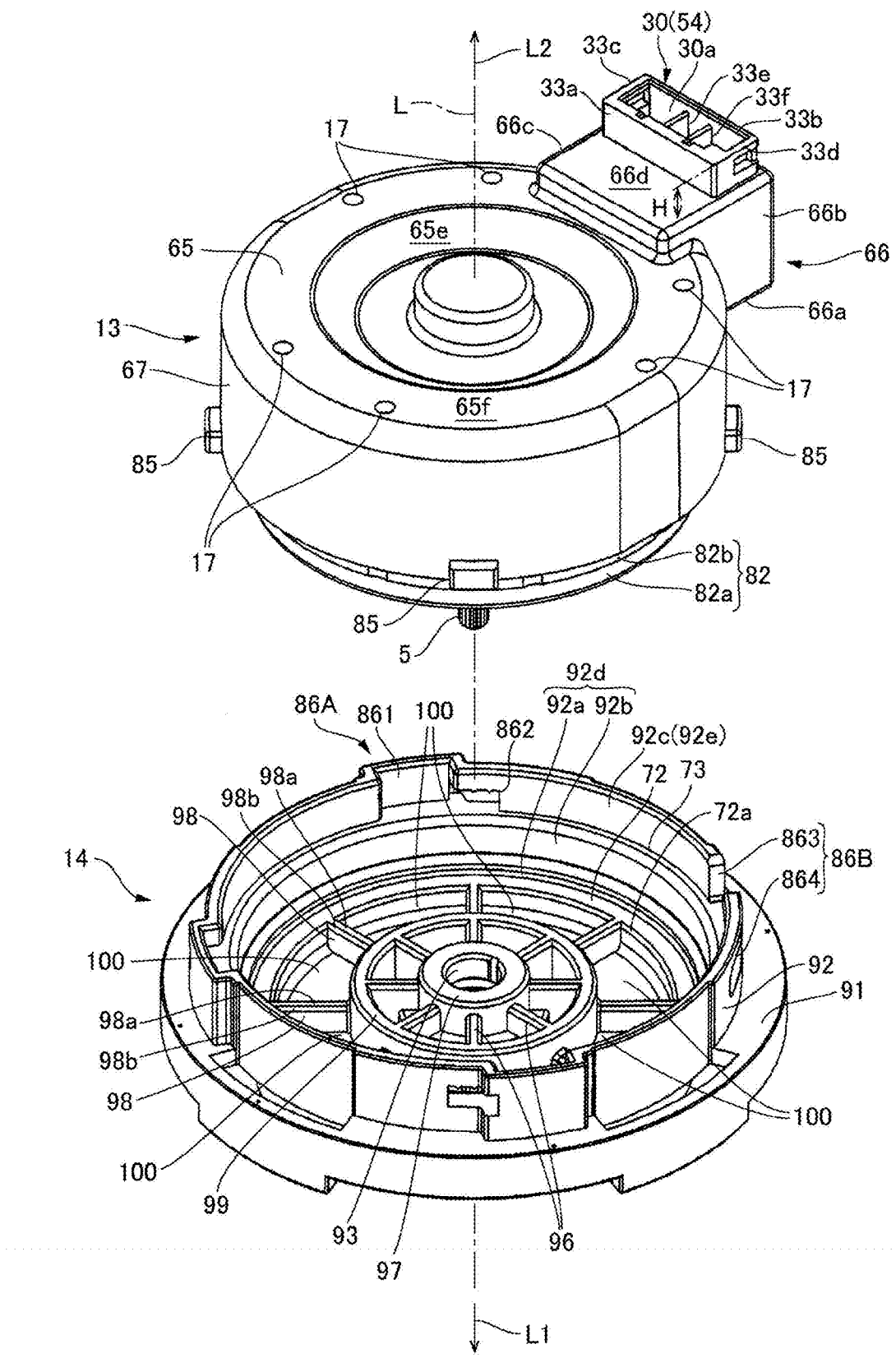
FIG. 4 is an exploded perspective view of the motor viewed from the counter output side.

FIG. 3 is an exploded perspective view of the motor 2 viewed from the output side L1, and FIG. 4 is an exploded perspective view of the motor viewed from the counter output side L2. FIG. 3 and FIG. 4 show a state in which a cover member 14 that constitutes a housing 12 of the motor 2 has been detached from a resin sealing member 13. The motor 2 is a DC brushless motor, and includes a rotor 10, a stator 11, and a housing 12 that houses these components. The housing 12 includes the resin sealing member 13 that covers the stator 11 from the counter output side L2, and the cover member 14 that covers the resin sealing member 13 from the output side L1. The cover member 14 is secured to the resin sealing member 13.

The case body 3 is placed on the cover member 14 from the output side L1. As a result, the space partitioned between the cover member 14 and the case body 3 forms the pump chamber 4. The resin sealing member 13 retains a first bearing member 15 that rotatably supports the counter output side L2 end portion of the rotating shaft 5 of the rotor 10. The cover member 14 retains a second bearing member 16 that rotatably supports the middle of the rotating shaft 5. The output side L1 end portion of the rotating shaft 5 protrudes from the housing 12 of the motor 2 toward the inside of the pump chamber 4, and the impeller 6 is attached thereto.

Rotor

As shown in FIG. 2A and FIG. 2B, the rotor 10 includes a rotating shaft 5, a magnet 20 surrounding the rotating shaft 5, and a retaining member 21 that retains the rotating shaft 5 and the magnet 20. The magnet 20 has an annular shape and is coaxially disposed with respect to the rotating shaft 5. The outer peripheral surface of the magnet 20 has N poles and S poles alternatingly magnetized in the circumferential direction. The rotating shaft 5 is made of stainless steel. The rotating shaft 5 has an annular groove formed near the center in the axis line L direction, and an E-ring 24 is secured to the annular groove. The E-ring 24 is a plate-shaped member made of metal. The E-ring 24 is embedded in the output side L1 end surface of the retaining member 21.

The rotor 10 includes a first bearing plate 45 disposed on the counter output side L2 of the retaining member 21, and a second bearing plate 46 disposed on the output side L1 of the retaining member 21. The first bearing plate 45 and the second bearing plate 46 are substantially annular metal plates. For example, the first bearing plate 45 and the second bearing plate 46 are metal washers. The first bearing plate 45 covers the counter output side L2 end surface of the retaining member 21 in a state where the rotating shaft 5 is passing through the center hole. Furthermore, the second bearing plate 46 covers the output side L1 end surface of the retaining member 21 and the E-ring 24 in a state where the rotating shaft 5 is passing through the center hole. The second bearing plate 46 makes surface contact with the E-ring 24. The first bearing plate 45 and the second bearing plate 46 are respectively retained by the counter output side L2 end surface and the output side L1 end surface of the retaining member 21. The sliding heat generated as a result of the second bearing plate 46 and the second bearing member 16 sliding during rotation of the rotor 10 is transmitted to the rotating shaft 5 via the E-ring 24, and then dissipated.

Stator

Figure 5:
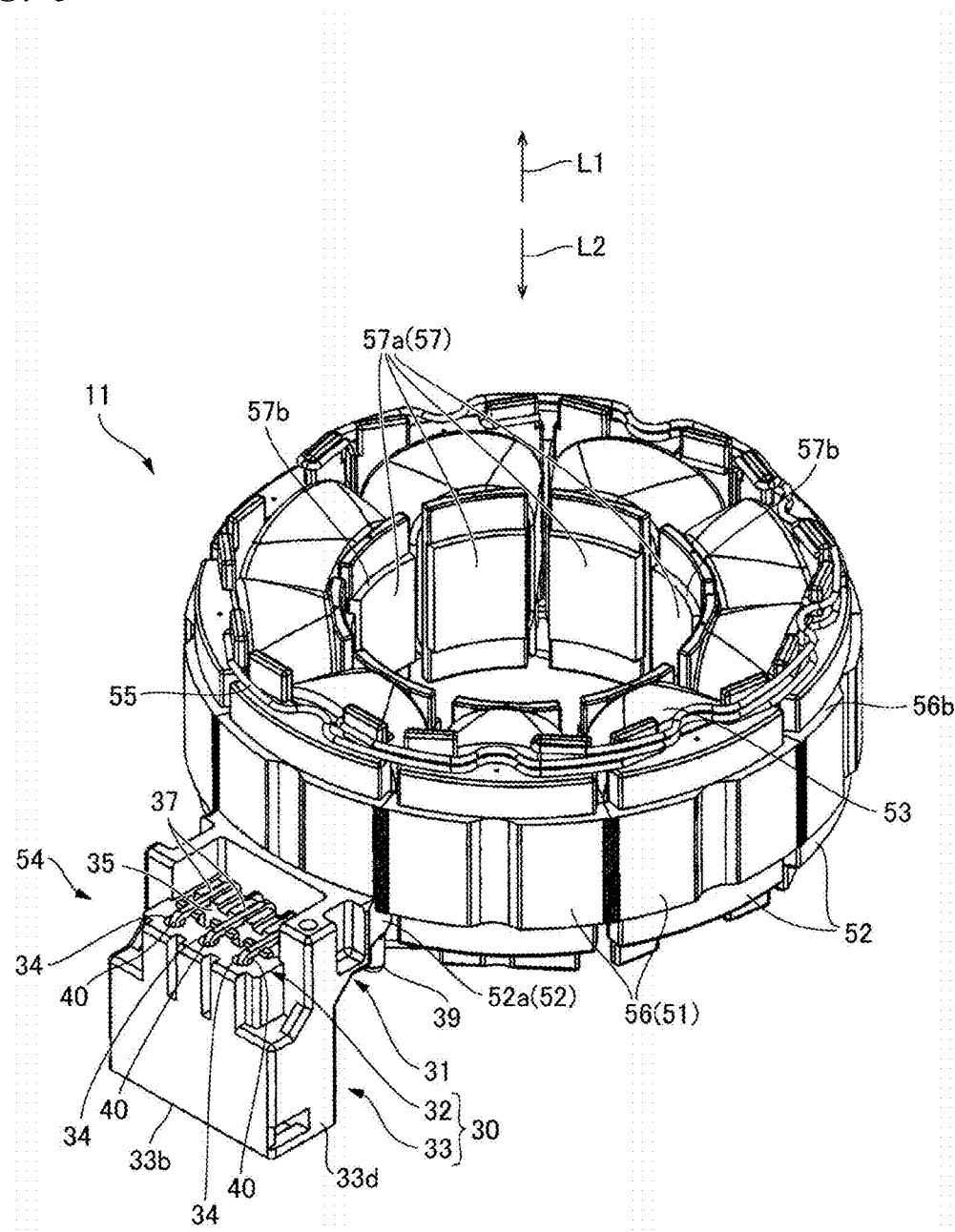
FIG. 5 is a perspective view of a stator viewed from the counter output side.
Figure 6:
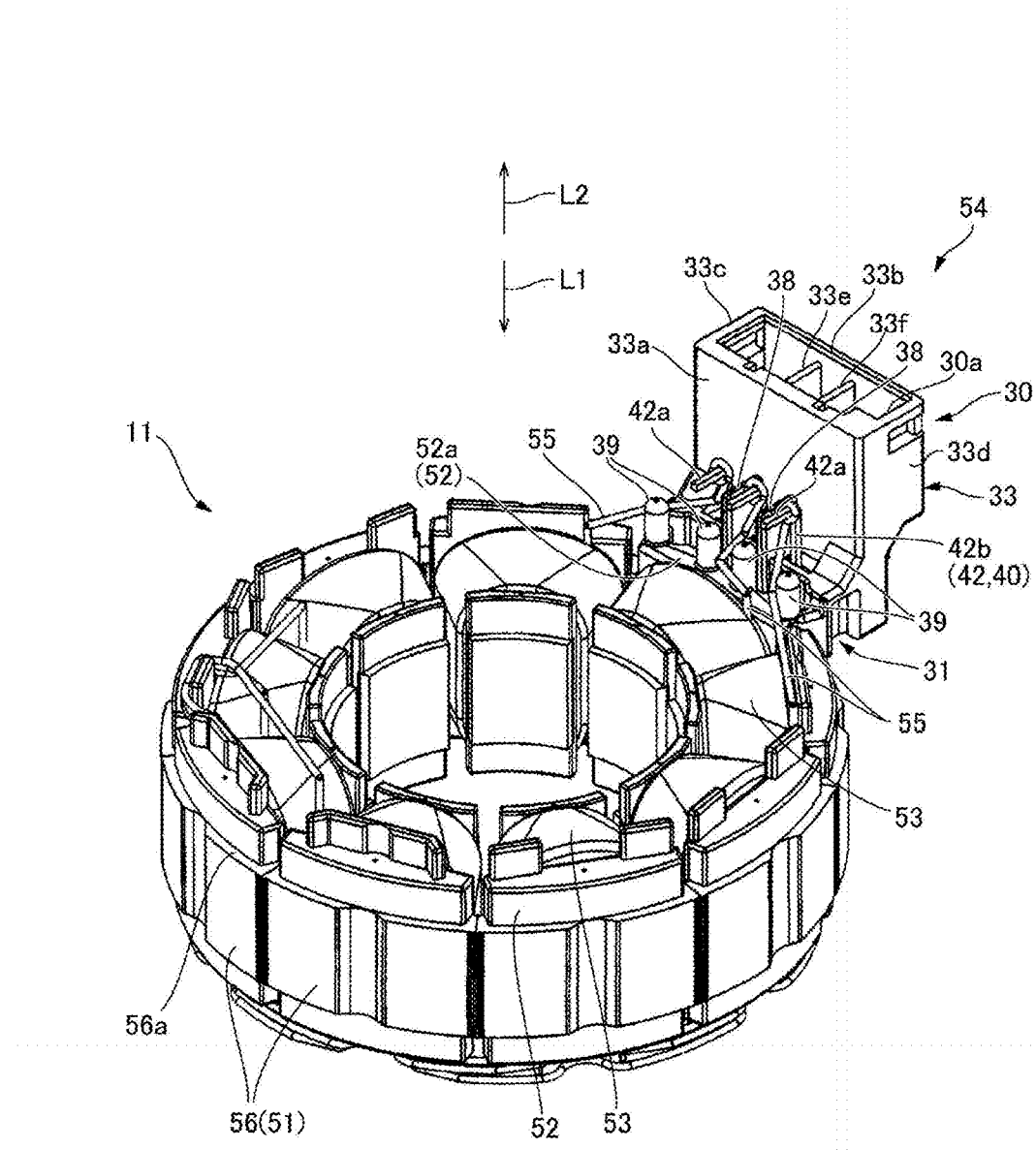
FIG. 6 is a perspective view of the stator viewed from the output side.

FIG. 5 and FIG. 6 are perspective views of the stator 11, where FIG. 5 is a perspective view viewed from the counter output side L2, and FIG. 6 is a perspective view viewed from the output side L1. The stator 11 includes an annular stator core 51 positioned on the outer peripheral side of the rotor 10, a plurality of coils 53 wound around the stator core 51 via insulators 52, and a connector 54 for connecting a power supply line that supplies power to the coils 53.

The stator core 51 is a laminated core formed by laminating thin magnetic plates made of a magnetic material. As shown in FIG. 5 and FIG. 6, the stator core 51 includes an annular portion 56 and a plurality of salient pole portions 57 that protrude radially inward from the annular portion 56. The plurality of salient pole portions 57 are formed with an equal angular pitch, and are disposed with a constant pitch in the circumferential direction. The inner peripheral side end surfaces 57a of the salient pole portions 57 are arc-shaped surfaces with the axis line L as the center. The inner peripheral side end surfaces 57a of the salient pole portions 57 face the outer peripheral surface of the magnet 20 of the rotor 10 with a slight gap.

The insulators 52 are formed from an insulating material such as a resin. The insulators 52 have a flanged cylindrical shape and are provided with a flange portion at both ends in the radial direction. The insulators 52 are attached to each of the plurality of salient pole portions 57. The coils 53 are wound around each of the plurality of salient pole portions 57 via the insulators 52. The insulators 52 partially cover the counter output side end surface 56a (see FIG. 6) of the annular portion 56 of the stator core 51, but the outer peripheral edge section of the counter output side end surface 56a is not covered by the insulators 52. Similarly, the insulators 52 partially cover the output side end surface 56b (see FIG. 5) of the annular portion 56 of the stator core 51, but the outer peripheral edge section of the output side end surface 56b is not covered by the insulators 52.

The coils 53 are constituted by a conductive wire 55 made of an aluminum alloy or a copper alloy. In the present embodiment, a conductive wire 55 in which an aluminum alloy is covered with a copper alloy is used. Furthermore, in the present embodiment, the number of salient pole portions 57 and coils 53 is nine. The motor 2 is a three-phase brushless motor, in which three of the nine coils 53 are U-phase coils, three of the remaining six coils are V-phase coils, and the remaining three coils are W-phase coils. The U-phase coils, V-phase coils, and W-phase coils are arranged in this order in the circumferential direction. The three U-phase coils are formed by sequentially winding a single conductive wire 55 around three salient pole portions 57, the three V-phase coils are formed by sequentially winding a single conductive wire 55 around three salient pole portions 57, and the three W-phase coils are formed by sequentially winding a single conductive wire 55 around three salient pole portions 57. The conductive wires 55 that constitute the U-phase coils, the V-phase coils, and the W-phase coils are routed to the connector 54.

Connector

The connector 54 is shaped so that a male external connector can be attached and detached. The connector 54 is connected to one of the plurality of insulators 52. The connector 54 includes a substantially rectangular connector housing 30, a connection portion 31 that connects the connector housing 30 and the insulator 52, and terminal pins 40 retained by the connector housing 30. The connector housing 30 is disposed on the outer peripheral side of the insulator 52 and on the counter output side L2 of the stator core 51, and is connected via the connection portion 31 to a section of the insulator 52 (flange portion 52a) positioned on the outer peripheral side of the coil 53. The connector housing 30 and the connection portion 31 are integrally formed with the insulator 52.

The connector 54 is a female connector 54 that includes three terminal pins 40, namely a terminal pin 40 to which one end portion of the conductive wire 55 constituting the U-phase coils is connected, a terminal pin 40 to which one end portion of the conductive wire 55 constituting the V-phase coils is connected, and a terminal pin 40 to which one end of the conductive wire 55 constituting the W-phase coils is connected. The other end of the conductive wire 55 constituting the U-phase coils, the other end of the conductive wire 55 constituting the V-phase coils, and the other end of the conductive wire 55 constituting the W-phase coils are connected to each other to form a common wire.

The connector housing 30 has a substantially rectangular shape with an opening on the counter output side L2. That is to say, the connector housing 30 is formed with a connection opening 30a which is an opening on the counter output side L2. The connector housing 30 includes a cylindrical portion 33 having a rectangular cylindrical shape that extends in the axis line L direction, and a bottom portion 32 that closes the output side L1 end portion of the cylindrical portion 33. The connection opening 30a is provided on the counter output side L2 end portion of the cylindrical portion 33. As shown in FIG. 6, the cylindrical portion 33 includes an inner side wall 33a positioned on the central side (that is to say, the insulator 52 side) of the stator 11, an outer side wall 33b parallel to the inner side wall 33a, and side walls 33c and 33d connected to the inner side wall 33a and the outer side wall 33b. The internal space of the connector housing 30 is divided into three portions by partition walls 33e and 33f parallel to the side walls 33c and 33d. Inside each of the spaces partitioned by the partition walls 33e and 33f is disposed one terminal connection portion 41 (see FIG. 2A) corresponding to an end portion of one of the terminal pins 40. When a male external connector is attached to the connection opening 30a, the terminals provided on the external connector make contact with the terminal pins 40.

As shown in FIG. 5, the bottom portion 32 is formed having the same number of through holes 34 as terminal pins 40. Three terminal pins 40 are attached to the connector housing 30 of the present embodiment, and therefore, through holes 34 are formed in three locations. The three through holes 34 are arranged in a line in the direction orthogonal to the radial direction of the stator 11. As shown in FIG. 2A and FIG. 5, a concave portion 35 positioned radially inward with respect to the through holes 34 (that is to say, on the insulator 52 side) is formed in the output side L1 surface of the bottom portion 32. The concave portion 35 has a hollow shape that recesses on the counter output side L2, and extends in a groove shape along the direction in which the three through holes 34 are disposed. Furthermore, the same number of through holes 36 as through holes 34 (see FIG. 2A) is provided in the output side L1 surface of the connection portion 31. That is to say, three pairs of through holes 34 and through holes 36 are provided in the output side L1 surface of the connector 54. Retaining grooves 37 that intersect the concave portion 35 (see FIG. 5) are respectively provided between the three pairs of through holes 34 and through holes 36. Sections of the terminal pins 40 that extend from the through holes 34 to the through holes 36 (which are joining portions 43 as described below) are retained by the retaining grooves 37.

The terminal pins 40 are formed by bending a metal wire having a square cross-sectional shape. The terminal pins 40 may also be formed by bending a metal wire having a circular cross-sectional shape. As shown in FIG. 2A, the terminal pin 40 is constituted by a terminal connection portion 41 which is press-fitted into the connector housing 30 and protrudes toward the connection opening 30a, a conductive wire connection portion 42 disposed between the connector housing 30 and the insulator 52, and a joining portion 43 which connects the terminal connection portion 41 and the conductive wire connection portion 42. The terminal connection portion 41 and the conductive wire connection portion 42 extend in a direction parallel with the axis line L direction. Furthermore, the joining portion 43 extends in a direction orthogonal to the axis line L direction, and is connected to the terminal connection portion 41 and the conductive wire connection portion 42 substantially at right angles.

The terminal pin 40 is attached to the connector housing 30 by press-fitting the terminal connection portion 41 with respect to the through hole 34 in the axis line L direction, and passing the conductive wire connection portion 42 through the through hole 36. As described above, by retaining the joining portion 43 in the retaining groove 37 formed in the outside surface of the connector housing 30, rotation of the terminal pin 40 is prevented. The tip of the conductive wire connection portion 42 is provided with a detachment prevention portion 42a formed by bending the tip portion of the conductive wire connection portion 42 radially inward in a substantially perpendicular fashion after being assembled to the connector housing 30. That is to say, the conductive wire connection portion 42 is constituted by a rising portion 42b that extends along the inner side wall 33a, and the detachment prevention portion 42a. The bending angle of the detachment prevention portion 42a may be an obtuse angle rather than being substantially perpendicular.

As shown in FIG. 6, the three conductive wire connection portions 42 are disposed at constant intervals in a direction orthogonal to the radial direction along the inner side wall 33a of the connector housing 30. The connector housing 30 includes wall portions 38 which orthogonally protrude radially inward from the inner side wall 33a. The wall portions 38 are provided at two locations representing the midpoint positions between adjacent conductive wire connection portions 42. The radially inward end edges of the wall portions 38 are positioned further radially inward than the rising portions 42b. On the other hand, in the wall portions 38, the axis line L direction end edges are positioned further on the output side L1 than the detachment prevention portions 42a. That is to say, the wall portions 38 have a shape whose width reaches adjacent rising portions 42b, but whose height does not reach adjacent detachment prevention portions 42a.

As shown in FIG. 6, the insulator 52 positioned on the inner peripheral side of the connector 54 includes a flange portion 52a provided on the outer peripheral side of the coil 53. The insulator 52, which is integrally formed with the connector 54, includes four cylindrical guide convex portions 39 that protrude from the counter output side L2 surface of the flange portion 52a which covers the outer peripheral surface of the stator core 51. The four guide convex portions 39 are arranged at a constant pitch in the circumferential direction. One conductive wire 55 is connected to each of the three conductive wire connection portions 42. The three conductive wires 55, which constitute the U-phase coils, the V-phase coils, and the W-phase coils, are guided by the four guide convex portions 39 and are routed from the coils 53 to the conductive wire connection portions 42. That is to say, the four guide convex portions 39 guide one of the three conductive wires 55 from the coils 53 positioned on the inner peripheral side of the connector housing 30 to the middle of the three conductive wire connection portions 42, guide one of the two remaining conductive wires 55 from the coils 53 positioned on the first side in the circumferential direction of the coils 53 positioned on the inner peripheral side of the connector housing 30 to the conductive wire connection portion 42 positioned on the first side end in the circumferential direction, and guide the last conductive wire 55 from the coil 53 positioned on the second side in the circumferential direction of the coils 53 positioned on the inner peripheral side of the connector housing 30 to the conductive wire connection portion 42 positioned on the second side end in the circumferential direction.

The conductive wires 55 are guided by the guide convex portions 39 and routed toward the conductive wire connection portions 42, and then routed along the rising portions 42b to the detachment prevention portions 42a. Because the conductive wires 55 are routed along the rising portions 42b, short circuiting is prevented by means of the wall portions 38. The conductive wires 55 are wound around the rising portions 42b or the detachment prevention portions 42a, and are soldered to the rising portions 42b or the detachment prevention portions 42a. As described above, because the wall portions 38 have a height that does not reach the detachment prevention portions 42a, a soldering iron is capable of soldering by closely approaching the upper ends of the detachment prevention portions 42a and the rising portions 42b without being blocked by the wall portions 38.

Resin Sealing Member

Figure 7:
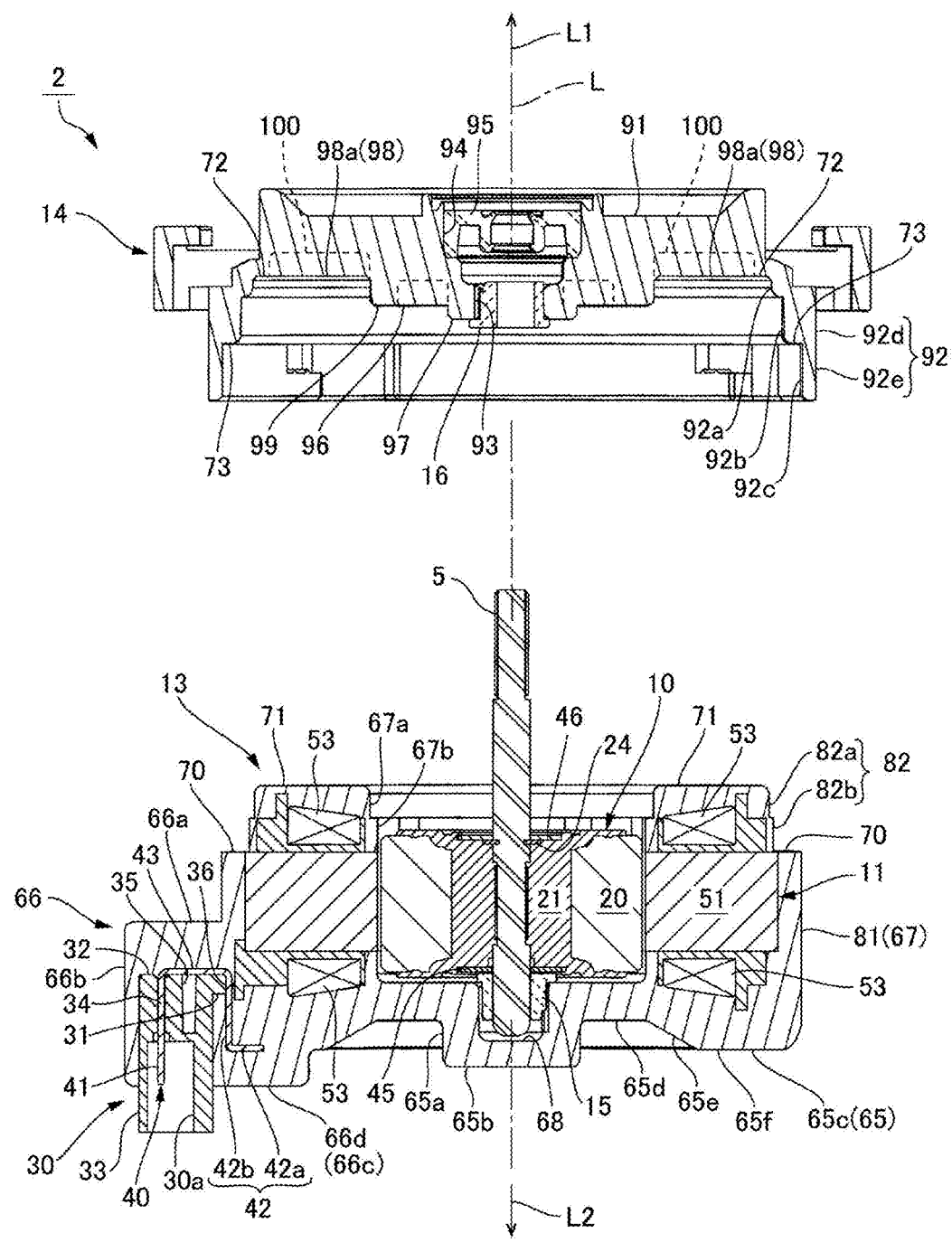
FIG. 7 is an exploded cross-sectional view of the motor.

FIG. 7 is an exploded cross-sectional view of the motor 2, and is a cross-sectional view of a state in which the cover member 14 has been separated from the resin sealing member 13. As shown in FIG. 2A and FIG. 2B to FIG. 4, and FIG. 7, the resin sealing member 13 includes a coil 53, an insulator 52, and a substantially disk-shaped sealing member bottom portion 65 covering the stator core 51 from the counter output side L2. Furthermore, the resin sealing member 13 includes a connector sealing portion 66, which extends from the sealing member bottom portion 65 toward the outer peripheral side and covers the connector 54, and a sealing member cylindrical portion 67, which extends from the sealing member bottom portion 65 toward the output side L1 and covers the coil 53, the insulator 52, and the stator core 51. The sealing member cylindrical portion 67 has a thick cylindrical shape. The central axis line of the sealing member cylindrical portion 67 coincides with the axis line L of the motor 2.

A bearing member retaining concave portion 68 is provided in a central section of the sealing member bottom portion 65. The bearing member retaining concave portion 68 retains a first bearing member 15 that rotatably supports the counter output side L2 end portion of the rotating shaft 5 of the rotor 10. The first bearing member 15 is made of resin, and has a shape which includes a cylindrical support portion provided with a through hole in which the rotating shaft 5 is disposed, and a flange portion that expands from the output side L1 end portion of the cylindrical portion toward the outer peripheral side. The contour shape of the first bearing member 15 when viewed from the axis line L direction is a letter-D shape. The first bearing member 15 is secured to the bearing member retaining concave portion 68 in a state where the flange portion is making contact with the sealing member bottom portion 65 from the output side L1. In the first bearing member 15, the support portion through which the rotating shaft 5 is inserted functions as a radial bearing of the rotating shaft 5, and the flange portion functions as a thrust bearing of the rotor 10. That is to say, the first bearing plate 45 secured to the retaining member 21 of the rotor 10 slides on the flange portion of the first bearing member 15.

As shown in FIG. 2A and FIG. 2B, the sealing member bottom portion 65 includes a cylindrical bearing support section 65a that surrounds the first bearing member 15 from the outer peripheral side in the radial direction, a circular closed section 65b that closes the lower end opening of the bearing support section 65a, a coil sealing section 65c positioned below the coil 53, and a connection section 65d that connects between the bearing support section 65a and the coil sealing section 65c. The bearing support section 65a and the closed section 65b constitute the bearing member retaining concave portion 68. The counter output side L2 surface of the coil sealing section 65c includes, along the shape of each coil 53 would around the insulator 52, a tapered surface 65e increasingly inclined to the counter output side L2 toward the outer peripheral side, and an annular surface 65f which is provided on the outer peripheral side of the tapered surface 65e and is perpendicular to the axis line L direction.

As shown in FIG. 2A, FIG. 4, and FIG. 5, the connector sealing portion 66 has a substantially rectangular shape as a whole. The connector sealing portion 66 includes a connector sealing portion bottom portion 66a covering the output side L1 of the connector 54, a connector sealing portion outer peripheral portion 66b covering both the outer radial side and the circumferential direction of the connector 54, and a connector sealing portion inner peripheral portion 66c which is positioned on the inner peripheral side of the connector housing 30 and covers the counter output side L2 of the connection portion 31, and protrudes from the sealing member bottom portion 65 to the counter output side L2. The connector sealing portion bottom portion 66a and the connector sealing portion outer peripheral portion 66b protrude from the sealing member cylindrical portion 67 on the outer peripheral side. Furthermore, the connector sealing portion inner peripheral portion 66c has a shape which is raised by one step from the annular surface 65f of the sealing member bottom portion 65. That is to say, the counter output side L2 end surface 66d of the connector sealing portion inner peripheral portion 66c is in a position that protrudes further on the counter output side L2 by one step relative to the annular surface 65f of the sealing member bottom portion 65.

In the connector 54, the open end portion of the connector housing 30 having the connection opening 30a, to which a male connector is attached and detached, protrudes from the connector sealing portion 66 on the counter output side L2 and is exposed to the outside. The connection opening 30a is provided in a position protruding by a dimension H (see FIG. 4) from the counter output side L2 end surface 66d of the connector sealing portion 66. In the connector 54, only the open end portion of the connector housing 30 having the connection opening 30a is exposed to the outside, and the joining portion 43 and the conductive wire connection portion 42 of the terminal pin 40 are completely covered by the connector sealing portion 66. Therefore, the connector sealing portion 66 prevents the terminal pin 40 from falling loose, and protects the terminal pin 40 from fluid. Furthermore, the conductive wire 55 routed from the coil 53 to the connector 54 is also covered by the connector sealing portion 66, and is protected from fluid.

As shown in FIG. 2A, FIG. 2B and FIG. 3, the sealing member cylindrical portion 67 includes a large diameter cylindrical section 81 which connects to the sealing member bottom portion 65, and a small diameter cylindrical section 82 having a smaller outside diameter dimension than the large diameter cylindrical section 81. The small diameter cylindrical section 82 includes a first small diameter cylindrical section 82a which constitutes the output side L1 end portion of the sealing member cylindrical portion 67, and a second small diameter cylindrical section 82b provided between the first small diameter cylindrical section 82*a* and the large diameter cylindrical section 81. The first small diameter cylindrical section 82*a* has a slightly smaller outside diameter than the second small diameter cylindrical section 82*b*.

On the outer peripheral surface of the sealing member cylindrical portion 67 is formed a resin sealing member side position regulating surface 70, which is a stepped surface facing the output side L1 at the boundary section between the second small diameter cylindrical section 82*b* and the large diameter cylindrical section 81. The resin sealing member side position regulating surface 70 is orthogonal to the axis line L direction. As described below, the resin sealing member side position regulating surface 70 is a surface that makes contact with the cover member 14 in the axis line L direction. Furthermore, the sealing member cylindrical portion 67 includes on the output side L1 end portion a resin sealing member side securing surface 71, which is an annular end surface orthogonal to the axis line L direction. As described below, the resin sealing member side securing surface 71 opposes the cover member 14 with a predetermined gap. The cover member 14 is secured to the resin sealing member 13 by an adhesive agent disposed in the gap between the resin sealing member side securing surface 71 and the cover member 14.

The outside diameter of the large diameter cylindrical section 81 is larger than the outside diameter of the annular portion 56 of the stator core 51, and the outside diameter of the second small diameter cylindrical section 82*b* is smaller than the outside diameter of the annular portion 56 of the stator core 51. Furthermore, the resin sealing member side position regulating surface 70 is positioned on the same plane as the counter output side end surface 56*a* of the annular portion 56 of the stator core 51. As a result, a plurality of arc-shaped opening portions 83 (see FIG. 3), which expose an outer peripheral edge section of the counter output side end surface 56*a* of the annular portion 56 of the stator core 51 on the output side L1, is formed on an inner peripheral section of the resin sealing member side position regulating surface 70.

As shown in FIG. 2A, FIG. 2B and FIG. 3, the inner peripheral surface of the sealing member cylindrical portion 67 is provided with, from the counter output side L2 toward the output side L1, a small diameter inner peripheral surface section 67*a*, and a large diameter inner peripheral surface section 67*b* having a larger inside diameter dimension than the small diameter inner peripheral surface section 67*a*. As shown in FIG. 2A and FIG. 2B, the small diameter inner peripheral surface section 67*a* is provided with a plurality of opening portions which expose the inner peripheral side end surfaces 57*a* of the salient pole portions 57 of the stator core 51 to the inner peripheral side. Furthermore, as shown in FIG. 3, the small diameter inner peripheral surface section 67*a* is provided with a plurality of groove-shaped notched portions 69 that extend in the axis line L direction. Each of the plurality of notched portions 69 is centrally positioned in the circumferential direction of each salient pole portion 57 of the stator core 51, and extend from the output side end surface 57*b* of the salient pole portion 57 (see FIG. 5) to the output side L1 end surface of the small diameter inner peripheral surface section 67*a*. Consequently, the output side end surfaces 57*b* of the salient pole portions 57 of the stator core 51 are exposed on the output side L1 at the angular positions in which the notched portions 69 are provided.

The outer peripheral surface of the large diameter cylindrical section 81 is provided with four engagement protrusion portions 85 which protrude on the outer peripheral side at equal angular intervals. The engagement protrusion portions 85 engage rotation engagement portions 86 provided on the cover member 14 as described below. The engagement protrusion portions 85 engage the rotation engagement portions 86 to regulate the detachment of the cover member 14 from the resin sealing member 13.

The resin sealing member 13 completely covers the coil 53, and protects the coil 53 from fluid. Furthermore, except for the opening (connection opening 30*a*) to which a male connector is attached and detached, the resin sealing member 13 is integrally formed up to the connector sealing portion 66 covering the connector 54, and prevents the terminal pin 40 assembled to the connector 54 from falling loose while also protecting the connection portion between the terminal pin 40 and the conductive wire 55 from fluid. The resin sealing member 13 is formed from a BMC (Bulk Molding Compound). In the present embodiment, the resin sealing member 13 is formed by placing the stator 11 in a mold, and injecting and curing a resin material inside the mold. That is to say, the resin sealing member 13 is integrally molded with the stator 11 by means of insert molding.

When insert molding is performed, the resin sealing member 13 is molded by injecting a resin into a mold in a state where which the stator core 51 is placed inside the mold and positioned in the radial direction and in the axis line L direction by bringing the stator core 51 into contact with the mold. Consequently, the accuracy with which the stator core 51 and the resin sealing member 13 are relatively positioned is improved. For example, a cylinder-shaped mold section is provided in advance in the mold, and the outer peripheral surface of the mold section is brought into contact with the inner peripheral side end surfaces 57*a* of the salient pole portions 57 to position the stator core 51 in the radial direction. As a result, as described above, the inner peripheral side end surfaces 57*a* of the salient pole portions 57 of the stator core 51 are exposed from the resin sealing member 13. Furthermore, when insert molding is performed, the mold is provided in advance with a first contact section capable of making contact with the output side end surfaces 57*b* of the salient pole portions 57, and a second contact section capable of making contact with the output side end surface 56*b* of the annular portion 56, the stator core 51 is positioned in the axis line L direction by bringing the first contact section and the second contact section into contact with the stator core 51. Consequently, as described above, a section of the output side end surface 57*b* of each salient pole portions 57 of the stator core 51 is exposed on the output side L1. Moreover, an outer peripheral section of the output side end surface 56*b* of the annular portion 56 is exposed on the output side L1.

As shown in FIG. 4, a plurality of holes 17 are formed in the sealing member bottom portion 65 which are continuous from the counter output side L2 surface of the sealing member bottom portion 65 to the counter output side L2 end surface of the insulator 52. In the present embodiment, six holes 17 are formed in the sealing member bottom portion 65. Specifically, a set of two holes 17 arranged with a 40° pitch around the axis line L are formed in three locations with a 120° pitch. The holes 17 have a shape that support pressing pins for the stator 11 set inside the mold to be pressed in the axis line L direction against a support surface (the first contact section and the second contact section described above) inside the mold at the time of molding.

Cover Member

FIG. 7 is an exploded cross-sectional view of the motor, and shows a state in which the cover member 14 has been detached from the resin sealing member 13. The cover member 14 is made of resin, and is secured on the output side L1 of the resin sealing member 13. The cover member 14 includes a disk-shaped cover member ceiling portion 91, and a cover member cylindrical portion 92 that protrudes from the cover member ceiling portion 91 on the counter output side L2. The center of the cover member ceiling portion 91 is provided with a through hole 93 which passes through in the axis line L direction. A circular concave portion 94 surrounding the through hole 93 is provided at the center of the output side L1 surface of the cover member ceiling portion 91, and an annular seal member 95 is disposed on the circular concave portion 94. The seal member 95 is disposed in the gap between the rotating shaft 5 and the cover member 14.

As shown in FIG. 4 and FIG. 7, the central section of the counter output side L2 surface of the cover member ceiling portion 91 is provided with a bearing member retaining cylindrical portion 97 positioned coaxially with respect to the through hole 93. As shown in FIG. 2A and FIG. 2B and FIG. 7, the second bearing member 16 is retained in the center hole of the bearing member retaining cylindrical portion 97. The second bearing member 16 is an identical member to the first bearing member 15 described above, which is disposed in the opposite axis line L direction. That is to say, the second bearing member 16 is made of resin, and includes a cylindrical support portion provided with a through hole in which the rotating shaft 5 is disposed, and a flange portion that expands from the output side L1 end portion of the cylindrical portion toward the outer peripheral side. The second bearing member 16 is secured to the bearing member retaining cylindrical portion 97 in a state where the flange portion is making contact with the bearing member retaining cylindrical portion 97 from the counter output side L2. In the second bearing member 16, the support portion through which the rotating shaft 5 is inserted functions as a radial bearing of the rotating shaft 5, and the flange portion functions as a thrust bearing of the rotor 10. That is to say, the second bearing plate 46 secured to the retaining member 21 of the rotor 10 slides on the flange portion of the second bearing member 16.

Figure 8:
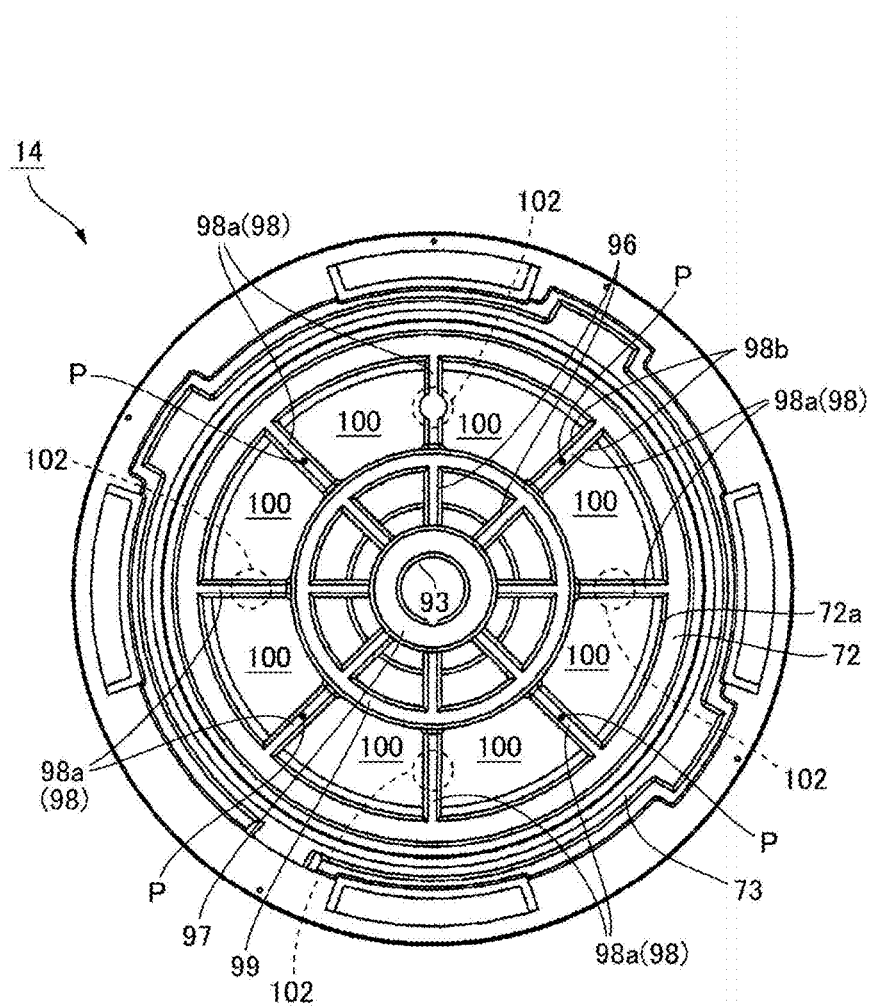
FIG. 8 is a plan view of a cover member viewed from the counter output side.

FIG. 8 is a plan view of the cover member 14 viewed from the counter output side L2. As shown in FIG. 4, FIG. 7 and FIG. 8, an annular cover member side securing surface 72 that connects to the inner peripheral surface of the cover member cylindrical portion 92 is provided along the outer peripheral edge of the counter output side L2 surface of the cover member ceiling portion 91. Further, a circular inner annular rib 99 is provided between the bearing member retaining cylindrical portion 97 and the cover member side securing surface 72 on the counter output side L2 surface of the cover member ceiling portion 91. The bearing member retaining cylindrical portion 97, the cover member side securing surface 72, and the inner annular rib 99 are coaxially provided. Moreover, a plurality of radial ribs 98 and a plurality of first adhesive agent reservoir portions 100 are provided between the inner annular rib 99 and the cover member side securing surface 72. In addition, a plurality of radial ribs 96 is provided between the inner annular rib 99 and the bearing member retaining cylindrical portion 97.

The inner annular rib 99 and the radial ribs 98 and 96 are convex portions that protrude on the counter output side L2. Furthermore, the first adhesive agent reservoir portions 100 are concave portions which recess further on the output side L1 than the cover member side securing surface 72 and the tip surfaces 98a of the radial ribs 98. The first adhesive agent reservoir portions 100 are concave portions that utilize the hollow shape of the cover member 14. That is to say, the first adhesive agent reservoir portions 100 double as the hollow shape of the cover member 14. Moreover, concave portions serving as a hollow shape are also formed on the inner peripheral side of the inner annular rib 99 between the radial ribs 96.

In the present embodiment, eight radial ribs 98 are radially disposed at an angular interval of 45 degrees. Furthermore, the radial ribs 96 are disposed at the same angular positions as the radial ribs 98. The first adhesive agent reservoir portions 100 are substantially fan-shaped concave portions provided between two radial ribs 98 that are adjacent in the circumferential direction, and are provided in eight locations in the present embodiment. The first adhesive agent reservoir portions 100 are partitioned on both circumferential direction sides by the radial ribs 98, and are partitioned on the inner peripheral side by the inner annular rib 99. Moreover, the first adhesive agent reservoir portions 100 are disposed on the inner peripheral side of the cover member side securing surface 72.

The amount of protrusion of the bearing member retaining cylindrical portion 97 toward the counter output side L2 is greater than the amount of protrusion of the inner annular rib 99. Furthermore, the inner annular rib 99 and the radial ribs 96 protrude further on the counter output side L2 than the cover member side securing surface 72. On the other hand, the tip surfaces 98a of the radial ribs 98 are positioned on the same plane as the cover member side securing surface 72. The tip surface of the bearing member retaining cylindrical portion 97, the tip surface of the inner annular rib 99, the tip surfaces of the radial ribs 98 and 96, and the cover member side securing surface 72 are all planes which are perpendicular to the axis line L. Chamfered surfaces are provided on the edges the first adhesive agent reservoir portions 100 on the outer peripheral side and in both circumferential directions. That is to say, a chamfered surface 72a is provided on the inner peripheral side edge of the cover member side securing surface 72. Furthermore, chamfered surfaces 98b are provided at the corner portions where the tip surfaces 98a and side surfaces of the radial ribs 98 are connected. Chamfered surfaces are also provided on the edges of the radial ribs 96 and the inner annular rib 99.

As shown in FIG. 4 and FIG. 7, the inside diameter of the cover member cylindrical portion 92 increases stepwise from the output side L1 toward the counter output side L2. That is to say, the inner peripheral surface of the cover member cylindrical portion 92 includes, in order from the output side L1, a first small diameter inner peripheral surface 92a, a second small diameter inner peripheral surface 92b, and a large diameter inner peripheral surface 92c. The cover member side position regulating surface 73, which is an annular step surface facing the counter output side L2, is formed on the boundary section between the second small diameter inner peripheral surface 92b and the large diameter inner peripheral surface 92c. The cover member side position regulating surface 73 is a plane orthogonal to the axis line L.

The cover member cylindrical portion 92 includes an upper annular cylindrical section 92d, which overlaps with the small diameter cylindrical section 82 of the resin sealing member 13 in the axis line L direction and covers the small diameter cylindrical section 82 of the resin sealing member 13 from the outer peripheral side, and a lower annular cylindrical section 92e, which is positioned on the outer peripheral side of the large diameter cylindrical section 81 of the resin sealing member 13. The upper annular cylindrical section 92d is a section further on the output side L1 than the cover member side position regulating surface 73. Furthermore, the lower annular cylindrical section 92e is a protrusion portion that protrudes further on the counter output side L2 than the cover member side position regulating surface 73, and covers the outer peripheral side of the resin sealing member 13.

As shown in FIG. 4, the lower annular cylindrical section 92e of the cover member cylindrical portion 92 is provided with rotation engagement portions 86 that engage the engagement protrusion portions 85 of the resin sealing member 13 in four locations in the circumferential direction. As shown in FIG. 3 and FIG. 4, the rotation engagement portions 86 in three of the four locations are first rotation engagement portions 86A, which include a groove portion 861 which extends from the counter output side L2 edge of the cover member cylindrical portion 92 toward the output side L1 and a substantially rectangular notched portion 862 which is connected to the groove portion 861 and extends in the circumferential direction. The remaining location is a second rotation engagement portion 86B, which includes a notched portion 863 which extends from the counter output side L2 edge of the cover member cylindrical portion 92 toward the output side L1, and a notched portion 864 connected to the notched portion 863 and which extends in the circumferential direction. The second rotation engagement portion 86B has an elastically deformable arm portion 865 provided on the counter output side L2 of the notched portion 864, and the arm portion 865 is provided with a hook portion 866 which is capable of engaging the engagement protrusion portion 85 in the circumferential direction.

Positioning Structure and Securing Structure of Cover Member

The cover member 14 is covered by the resin sealing member 13 from the output side L1 in a state where the rotor 10 is disposed on the inside of the resin sealing member 13, and the rotor 10 is supported by the first bearing member 15. When the resin sealing member 13 is covered by the cover member 14, as shown in FIG. 2A and FIG. 2B, a lower end section of the inner annular rib 99 is fitted to the inner peripheral side of the sealing member cylindrical portion 67 of the resin sealing member 13. Consequently, the cover member 14 and the resin sealing member 13 are positioned in the radial direction, and the axis line L of the rotating shaft 5 coincides with the central axis line of the stator 11. The cover member 14 is positioned in the axis line L direction as a result of the cover member side position regulating surface 73 provided on the cover member cylindrical portion 92 making contact in the axis line L direction with the resin sealing member side position regulating surface 70, which is a step surface provided on the outer peripheral surface of the resin sealing member 13. Consequently, the cover member ceiling portion 91 covers the rotor 10 and the resin sealing member 13 from above in a state where the rotating shaft 5 is passing through cover member ceiling portion 91 in the vertical direction. Furthermore, a seal member 95 disposed in a circular concave portion 94 of the cover member ceiling portion 91 seals together the rotating shaft 5, the cover member 14, and the second bearing member 16. In addition, the cover member cylindrical portion 92 surrounds an output side L1 section of the resin sealing member 13 from the outer peripheral side.

Thereafter, the cover member 14 and the resin sealing member 13 are relatively rotated in the circumferential direction, and as shown in FIG. 1, the engagement protrusion portions 85 of the resin sealing member 13 and the rotation engagement portions 86 (the first rotation engagement portions 86A and the second rotation engagement portion 86B) of the cover member 14 engage each other. That is to say, the cover member 14 is rotated in the circumferential direction with respect to the resin sealing member 13 in a state where the four engagement protrusion portions 85 are inserted into the groove portions 861 or the notched portions 863 such that the engagement protrusion portions 85 engage the notched portions 862 and 864. The cover member 14 and the resin sealing member 13 are positioned in the circumferential direction as a result of the engagement protrusion portion 85 in one of the four locations engaging the hook portion 866 provided on the second rotation engagement portion 86B. When the procedure that relatively rotates the cover member 14 and the resin sealing member 13 in the circumferential direction is performed manually, the resin sealing member 13 can be relatively rotated with respect to the cover member 14 by supporting the resin sealing member 13 using the connector sealing portion 66, which projects from the sealing member cylindrical portion 67 on the outer peripheral side, as a fulcrum.

Figure 9A:
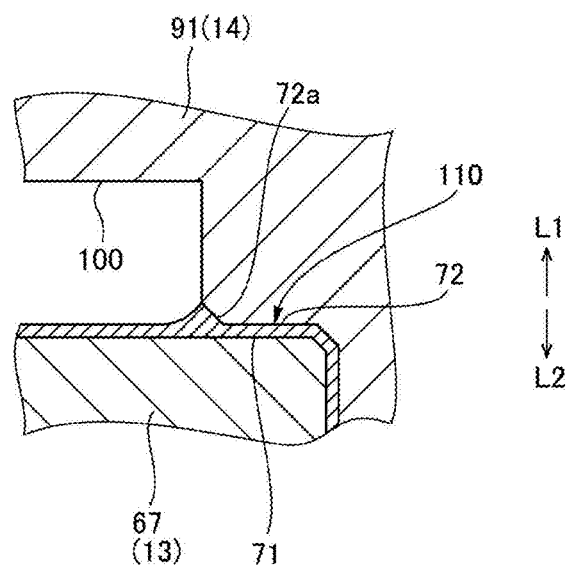
FIG. 9A and FIG. 9B are an enlarged cross-sectional view of an adhesive securing portion between a resin sealing member side securing surface and the cover member.
Figure 9B:
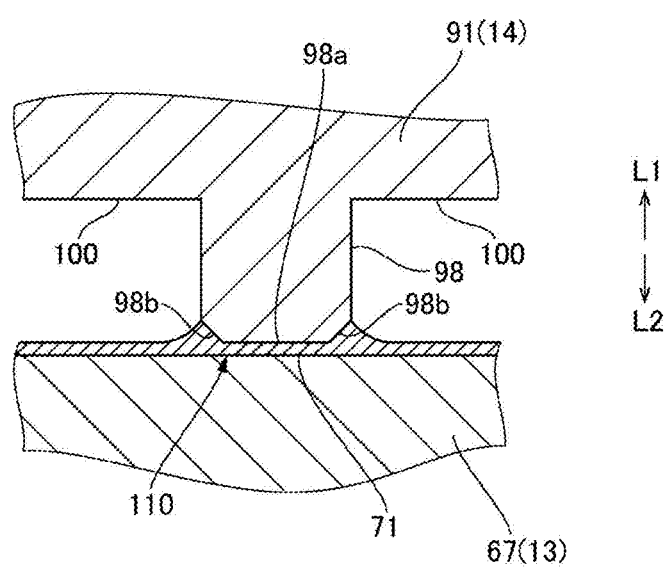

FIG. 9 is an enlarged cross-sectional view of the adhesive securing portion between the resin sealing member side securing surface 71 and the cover member 14, where FIG. 9A is an enlarged cross-sectional view of the adhesive securing portion between the resin sealing member side securing surface 71 and the cover member side securing surface 72 (radial direction partial cross-sectional view), and FIG. 9B is an enlarged cross-sectional view of the adhesive securing portion between the resin sealing member side securing surface 71 and the radial rib 98 (circumferential direction partial cross-sectional view). When the cover member 14 is covered by the resin sealing member 13, an adhesive agent is applied to the resin sealing member side securing surface 71 which is an output side L1 end surface of the sealing member cylindrical portion 67 (see FIG. 3 and FIG. 7). When the cover member side position regulating surface 73 and the resin sealing member side position regulating surface 70 are brought into contact in the axis line L direction, the resin sealing member side securing surface 71 faces the cover member side securing surface 72 and the tip surface 98a of the radial rib 98 with a predetermined gap.

The adhesive agent applied to the resin sealing member side securing surface 71 is cured in a state where the gap is filled between the resin sealing member side securing surface 71 and the cover member side securing surface 72, and between the resin sealing member side securing surface 71 and the tip surface 98a of the radial rib 98. Therefore, as shown in FIG. 9A, the cover member side securing surface 72 is secured to the resin sealing member side securing surface 71 via the adhesive layer 110. Further, as shown in FIG. 9B, the tip surface 98a of the radial rib 98 is secured to the resin sealing member side securing surface 71 via the adhesive layer 110. The resin sealing member side securing surface 71 and the cover member side securing surface 72 are both annular surfaces, and are provided on the entire circumference of the cover member 14. Therefore, because the adhesive agent layer 110 is formed on the entire circumference, the waterproof properties are ensured by the adhesive agent layer 110.

Here, if the cover member 14 and the resin sealing member 13 are relatively rotated in the circumferential direction before curing the adhesive so that the engagement protrusion portions 85 and the rotation engagement portions 86 engage each other, the adhesive agent applied to the resin sealing member side securing surface 71 can be spread in the circumferential direction. Therefore, the adhesive agent can be distributed to the locations where adhesion is desired, and the adhesive agent can be distributed with certainty over the entire circumference. Furthermore, if the cover member 14 and the resin sealing member 13 are relatively rotated in the circumferential direction, the adhesive agent enters between the chamfered surface 98b provided at a corner portion of the radial rib 98 and the resin sealing member side securing surface 71. When an adhesive agent with a low viscosity is used, surface tension causes the adhesive agent to collect in a section with a wide gap. In other words, the adhesive agent collects along the edges of the cover member side securing surface 72 and the radial rib 98, which are provided with the chamfered surfaces 72a and 98b.

The first adhesive agent reservoir portion 100 is provided in a position adjacent in the inner peripheral side with respect to the cover member side securing surface 72. Therefore, when excessive adhesive agent is applied to the resin sealing member side securing surface 71, the adhesive agent protruding on the inner peripheral side of the cover member side securing surface 72 is retained by the first adhesive agent reservoir portion 100. Therefore, entry of the adhesive agent toward the rotor 10 side is suppressed. Furthermore, the adhesive agent protruding on both circumferential direction sides of the radial rib 98 is also retained by the first adhesive agent reservoir portion 100.

The cover member 14 includes a second adhesive agent reservoir portion 101 provided between the cover member side securing surface 72 and the cover member side position regulating surface 73. That is to say, as shown in FIG. 2B, a first small diameter inner peripheral surface 92a and a second small diameter inner peripheral surface 92b are provided between the cover member side securing surface 72 and the cover member side position regulating surface 73, but the second small diameter inner peripheral surface 92b is disposed so as to leave a predetermined gap in the radial direction with the outer peripheral surface of the small diameter cylindrical section 82 of the resin sealing member 13. This gap becomes the second adhesive agent reservoir portion 101. Therefore, when an excessive amount of adhesive agent is applied to the resin sealing member side securing surface 71, the adhesive agent protruding on the outer peripheral side from the cover member side securing surface 72 is retained by the second adhesive agent reservoir portion 101. Therefore, the adhesive agent is prevented from protruding from the gap between the cover member 14 and the resin sealing member 13 toward the outer peripheral surface of the motor 2.

Positional Relationship Between Gate Marks and Radial Ribs

The cover member 14 is a resin molded article. As shown in FIG. 3, a plurality of gate marks 102, which are marks from a resin injection port into the mold, are formed on the output side L1 surface of the cover member 14. The plurality of gate marks 102 are annularly disposed at equal angular intervals around the rotating shaft 5. For example, in the present embodiment, the gate marks 102 are formed in four locations at a 90° pitch around the rotating shaft 5. On the other hand, the plurality of radial ribs 98 are disposed at equal angular intervals around the rotating shaft 5 on the counter output side L2 surface of the cover member 14, and the radial ribs 98 are formed in positions corresponding to the positions of the gate marks 102. That is to say, the angular positions of the gate marks 102 and the radial ribs 98 are set such that circumferential direction midpoints P of gate marks 102 that are adjacent to each other in the circumferential direction coincide with certainty with the positions in which one of the plurality of radial ribs 98 is formed.

In the present embodiment, as shown in FIG. 8, the four gate marks 102 are each provided in positions overlapping with four of the eight radial ribs 98 when viewed in the axis line L direction. Further, the circumferential direction midpoints P of gate marks 102 that are adjacent to each other in the circumferential direction are each in positions overlapping with the radial ribs 98 when viewed in the axis line L direction. More specifically, the angular positions of the gate marks 102 and the radial ribs 98 are set such that the central positions of the circumferential direction widths of the radial ribs 98 and the midpoints P overlap when viewed in the axis line L direction. The circumferential direction midpoints P of the gate marks 102 coincide with locations (weld lines P1: imaginary lines indicated by single-dotted chain line in FIG. 3) at which the resin flowing in from adjacent gates merge at the time of molding the cover member 14. Therefore, by matching the angular positions of the midpoints P and the angular positions of the radial ribs 98, the radial ribs 98 can be formed on the weld line P1, and the strength of the cover member 14 can be ensured as a result of the radial ribs 98 reinforcing the sections overlapping the weld line P1.

Main Effects of Present Embodiment

As described above, in the motor 2 and the pump device 1 of the present embodiment, a resin molded article is used as the cover member 14 of the motor 2, the cover member 14 being secured to the resin sealing member 13 and having radial ribs 98 formed in positions overlapping each of the midpoints P of adjacent gate marks 102 in the axis line L direction. Therefore, the radial ribs 98 are capable of reinforcing the locations (weld lines P1) at which the resin flowing in from adjacent gates merges at the time of molding the cover member 14. In particular, in the present embodiment, because the gate marks 102 are annularly disposed around the rotating shaft 5 and the radial ribs 98 extend in the radial direction around the rotating shaft 5, the radial ribs 98 can be disposed along the weld lines P1. Therefore, the strength of the cover member can be ensured. Furthermore, because the radial ribs 98 and the gate marks 102 are each disposed at equal angular intervals, the cover member 14 can be uniformly reinforced.

In the present embodiment, the cover member 14 includes the cover member side securing surface 72 which faces, in the axis line L direction, the resin sealing member side securing surface 71 provided on the resin sealing member 13, and further, the tip surfaces 98a of the plurality of radial ribs 98 are positioned on the same plane as the cover member side securing surface 72. Therefore, the cover member side securing surface 72 is secured to the resin sealing member side securing surface 71 via the adhesive resin layer 110, and further, the tip surfaces 98a of the radial ribs 98 can be utilized as a securing surface for securing to the resin sealing member side securing surface 71. Therefore, the area of the securing surface can be ensured. Furthermore, because the securing surface can be extended to the inner peripheral side by means of the radial ribs 98, the securing strength can be secured.

In the present embodiment, the position regulating surfaces at which the cover member 14 and the resin sealing member 13 make contact (the cover member side position regulating surface 73 and the resin sealing member side position regulating surface 70), and the securing surfaces at which the cover member 14 and the resin sealing member 13 are secured by an adhesive agent (the cover member side securing surface 72 and the resin sealing member side securing surface 71) are separately provided. Therefore, the cover member 14 and the resin sealing member 13 can be brought into contact and positioned with a high accuracy, while being configured such that the securing surfaces of both members face each other with a gap in which the adhesive agent is disposed. Therefore, the accuracy with which the cover member 14 can be positioned in the axis line L direction with respect to the resin sealing member 13 can be improved. Furthermore, by using an adhesive agent to secure the resin sealing member 13 and the cover member 14, it is not necessary to provide a securing structure such as a screw securing portion or a hook. Therefore, the structure of the securing location can be simplified.

In the present embodiment, because a first adhesive agent reservoir portion 100 is provided which recesses further on the output side L1 (first side in the axis line L direction) than the cover member side securing surface 72, the adhesive agent that protrudes from the cover member side securing surface 72 is retained in the first adhesive agent reservoir portion 100. Therefore, even if the application amount of the adhesive agent is not strictly controlled, adverse effects that arise due to protrusion of the adhesive agent caused by excessive application can be suppressed. Furthermore, because the first adhesive agent reservoir portion 100 doubles as a hollow shape of the cover member 14, the molding properties of the cover member 14 can be improved.

In the present embodiment, because the cover member side securing surface 72 is disposed on an outer peripheral side of the first adhesive agent reservoir portion 100, if the adhesive agent is excessively applied, the adhesive agent that protrudes on the inner peripheral side is accommodated in the first adhesive agent reservoir portion 100, and the likelihood of the protruding adhesive agent reaching the rotor 10 is low. Therefore, adverse effects that arise due to protrusion of the adhesive agent can be suppressed.

In the present embodiment, because the cover member side securing surface 72 includes the chamfered surface 72*a* formed on an edge adjacent to the first adhesive agent reservoir portion 100, surface tension of the adhesive agent can be used to collect the adhesive agent on the edge of the cover member side securing surface 72. Therefore, the securing strength can be increased. Furthermore, because the chamfered surfaces 98*b* are also formed on the edge of the tip surfaces 98*a* of the radial ribs 98, surface tension of the adhesive agent can be used to collect the adhesive agent along the edges of the radial ribs 98. Therefore, the securing strength can be increased. Moreover, by collecting the adhesive agent along the edges of the radial ribs 98, the detent effect of the cover member 14 can be increased.

In the present embodiment, the resin sealing member side position regulating surface 70 is disposed further on the counter output side L2 (second side in the axis line L direction) than the resin sealing member side securing surface 71, and the second adhesive agent reservoir portion 101 is formed between the cover member side position regulating surface 73 and the cover member side securing surface 72, and therefore, the second adhesive agent reservoir portion 101 can suppress the protrusion of the adhesive agent toward the outer peripheral surface of the motor.

In the present embodiment, the cover member 14 includes a lower annular cylindrical section 92*e* of the cover member cylindrical portion 92, which is a protrusion portion that protrudes further on the counter output side L2 (the second side in the axis line L direction) than the cover member side position regulating surface 73 and covers the outer peripheral side of the resin sealing member 13. Therefore, the corner portion at which the outer peripheral surface of the resin sealing member 13 and the resin sealing member side position regulating surface 70 are connected can be protected by the cover member 14. Moreover, if the outer peripheral surface of the resin sealing member 13 is configured such that the entire circumference is covered by the lower annular cylindrical section 92*e* of the cover member cylindrical portion 92, water and the like can be prevented from entering between the cover member 14 and the resin sealing member 13, yielding a waterproof effect.

In the present embodiment, because the engagement protrusion portions 85 are provided on the outer peripheral surface of the resin sealing member 13, and the rotation engagement portions 86 (the first rotation engagement portions 86A and the second rotation engagement portion 86B) that engage the engagement protrusion portions 85 by means of relative rotation of the cover member 14 with respect to the resin sealing member 13 around the axis line L are provided on the lower annular cylindrical section 92*e* of the cover member cylindrical portion 92, the adhesive agent can be spread in the circumferential direction because the cover member 14 is relatively rotated with respect to the resin sealing member 13 when the engagement protrusion portions 85 and the rotation engagement portions 86 engage each other.

In the present embodiment, because the cover member side securing surface 72 and the resin sealing member side securing surface 71 are provided on the entire circumference, the adhesive agent can be delivered over the entire circumference. Therefore, the adhesive agent is capable of preventing water and the like from entering the rotor 10 side, and a waterproof effect can be provided. Therefore, an O-ring can be omitted, and costs can be reduced. Furthermore, for example, because a rotating engagement structure is provided by means of the rotation engagement portions 86 and the engagement protrusion portions 85 provided between the cover member 14 and the resin sealing member 13 as described above, the adhesive agent can be distributed over the entire circumference due to the rotation of the cover member 14, enabling a waterproof function to be provided and for malfunctions such as the twisting of the O-ring caused by rotation of the cover member 14 to be resolved.

In the present embodiment, the stator 11 includes a substantially annular stator core 51, at least an outer peripheral section of the output side end surface 56*b* of the stator core 51 is exposed from the resin sealing member 13, and the resin sealing member side position regulating surface 70 is provided on the outer peripheral side of the output side end surface 56*b* and positioned on the same plane as the output side end surface 56*b*. Therefore, the outer peripheral side of the end surface of the stator core 51, which is positioned so as to make contact with the mold at the time of molding, can be covered and insulated by the cover member 14.

Modifications (1) The cover member 14 of the present embodiment is provided with eight radial ribs 98 and eight first adhesive agent reservoir portions 100 between the inner annular rib 99 and the cover member side securing surface 72, however the number, size, and positions of the radial ribs 98 may be changed as appropriate. For example, it is possible for just four radial ribs 98 to be provided that pass through intermediate positions in the circumferential direction of gate marks 102 that are adjacent to each other in the circumferential direction. Furthermore, the number, size, and positions of the first adhesive agent reservoir portions 100 may be changed as appropriate. Moreover, at least an embodiment of the present invention is also applicable to cases where the number of gate marks 102 is not four.

(2) The cover member 14 and the resin sealing member 13 of the present embodiment is provided with a rotating engagement structure constituted by engagement protrusion portions 85 and rotation engagement portions 86 (the first rotation engagement portions 86A and the second rotation engagement portion 86B), however such a rotating engagement structure does not have to be provided. If a rotating engagement structure is not provided, the entire circumference of the outer peripheral surface of the resin sealing member 13 can be covered by the lower annular cylindrical section 92e of the cover member cylindrical portion 92. Therefore, because thin sections of the BMC resin coating layer can be covered by the lower annular cylindrical section 92e, the insulating effect can be enhanced. Furthermore, the waterproof effect can be enhanced.

(3) In the cover member 14 and the resin sealing member 13 of the present embodiment, the rotating engagement structure is constituted by forming the engagement protrusion portions 85 on the resin sealing member 13 and the rotation engagement portions 86 on the cover member 14, however a mode can also be employed in which the engagement protrusion portions are formed on the cover member 14 and the rotation engagement portions are formed on the resin sealing member.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A motor comprising:
   a rotor provided with a rotating shaft that protrudes to a first side in an axial direction;
   a stator disposed on an outer peripheral side of the rotor;
   a resin sealing member that covers the stator; and
   a cover member that is disposed on the first side of the resin sealing member and supports the rotating shaft; wherein
   the cover member comprises a plurality of gate marks disposed at different angular positions and a plurality of ribs that protrude to a second side in the axial direction, and
   the ribs are disposed at positions where each midpoint between the gate marks adjacent to each other in the circumferential direction overlap with an axis of the rotor,
   wherein
   the cover member comprises a cover member side securing surface that faces, in the axial direction, a resin sealing member side securing surface provided on the resin sealing member,
   the cover member side securing surface is secured to the resin sealing member side securing surface via an adhesive agent layer, and
   the cover member side securing surface is positioned on a same plane as tip surfaces of the plurality of ribs.

2. The motor according to claim 1, wherein
   the plurality of gate marks is annularly disposed around the rotating shaft, and
   the plurality of ribs extends in a radial direction around the rotating shaft.

3. The motor according to claim 1, wherein
   a first adhesive agent reservoir portion which recesses on the first side is provided between adjacent ribs of the plurality of ribs.

4. The motor according to claim 3, wherein
   the first adhesive agent reservoir portion is shaped as a hollow shape of the cover member.

5. The motor according to claim 3, wherein
   the cover member side securing surface is provided with a chamfered surface formed on an edge which is adjacent to the first adhesive agent reservoir portion.

6. The motor according to claim 1, wherein
   each rib of the plurality of ribs comprises a chamfered surface formed on an edge of a tip surface facing the second direction.

7. The motor according to claim 1, wherein
   the cover member side securing surface and the resin sealing member side securing surface are provided on the entire circumference.

8. The motor according to claim 1, wherein
   the ribs and the gate marks are each disposed at equal angular intervals.

9. A motor comprising:
   a rotor provided with a rotating shaft that protrudes to a first side in an axial direction;
   a stator disposed on an outer peripheral side of the rotor;
   a resin sealing member that covers the stator; and
   a cover member that is disposed on the first side of the resin sealing member and supports the rotating shaft; wherein
   the cover member comprises a plurality of gate marks disposed at different angular positions and a plurality of ribs that protrude to a second side in the axial direction, and
   the ribs are disposed at positions where each midpoint between the gate marks adjacent to each other in the circumferential direction overlap with an axis of the rotor, wherein
   the cover member comprises a protrusion portion that protrudes on the second side and covers an outer peripheral side of the resin sealing member,
   an engagement protrusion portion is provided on the outer peripheral surface of the resin sealing member, and
   the protrusion portion comprises a rotation engagement portion that engages the engagement protrusion portion as a result of the cover member being rotated around the rotating shaft in a state where the cover member is making contact with the resin sealing member in the axial direction.

10. A pump device comprising:
    a motor comprising:
    a rotor provided with a rotating shaft that protrudes to a first side in an axial direction;
    a stator disposed on an outer peripheral side of the rotor;
    a resin sealing member that covers the stator; and
    a cover member that is disposed on the first side of the resin sealing member and supports the rotating shaft; wherein the cover member comprises a plurality of gate marks disposed at different angular positions and a plurality of ribs that protrude to a second side in the axial direction, and the ribs are disposed at positions where each midpoint between the gate marks adjacent to each other in the circumferential direction overlap with an axis of the rotor; and an impeller attached to an end portion of the rotating shaft which passes through the cover member and protrudes on the first side of the cover member, wherein the cover member comprises a cover member side securing surface that faces, in the axial direction, a resin sealing member side securing surface provided on the resin sealing member, the cover member side securing surface is secured to the resin sealing member side securing surface via an adhesive agent layer, and the cover member side securing surface is positioned on a same plane as tip surfaces of the plurality of ribs.

\* \* \* \* \*